US011779865B2

(12) United States Patent
Astle et al.

(10) Patent No.: US 11,779,865 B2
(45) Date of Patent: Oct. 10, 2023

(54) GRAVITY-FED FILTER INTERCONNECT UTILIZING CODED POLYMAGNETS

(71) Applicant: KX Technologies LLC, West Haven, CT (US)

(72) Inventors: Robert Astle, Middlefield, CT (US); Matthew W. Hartmann, Evansville, IN (US)

(73) Assignee: KX TECHNOLOGIES LLC, West Haven, CT (US)

( * ) Notice: Subject to any disclaimer, the term of this patent is extended or adjusted under 35 U.S.C. 154(b) by 45 days.

(21) Appl. No.: 17/235,563

(22) Filed: Apr. 20, 2021

(65) Prior Publication Data
US 2021/0322903 A1    Oct. 21, 2021

Related U.S. Application Data

(60) Provisional application No. 63/013,190, filed on Apr. 21, 2020.

(51) Int. Cl.
*B01D 35/06* (2006.01)
*H01F 7/02* (2006.01)
(Continued)

(52) U.S. Cl.
CPC ........... *B01D 35/06* (2013.01); *B01D 35/153* (2013.01); *C02F 1/003* (2013.01); *C02F 1/48* (2013.01);
(Continued)

(58) Field of Classification Search
CPC ................. B01D 35/06; B01D 35/153; B01D 2201/4046; B01D 2201/4069; C02F 1/003;
(Continued)

(56) References Cited

U.S. PATENT DOCUMENTS 3,290,888 A    12/1966  Palmer
3,420,266 A     1/1969  Downey
(Continued)

FOREIGN PATENT DOCUMENTS

CN    204099679         1/2015
EP      3078638 A1 * 10/2016 .............. C02F 1/003
EP      2438601         3/2017

OTHER PUBLICATIONS http://www.polymagnet.com/media/Polymagnet-White-Paper-3-Smart-Magnets-for-Precision-Alignment.

*Primary Examiner* — Liam Royce
(74) *Attorney, Agent, or Firm* — DeLio Peterson & Curcio LLC; Brian G. Schlosser

(57) ABSTRACT

A gravity-fed filtration system interconnection structure comprising a reservoir for receiving ingress fluid, and a second, dispensing reservoir. A carrier or shuttle having a carrier magnet is connected to a sluice gate valve which normally blocks the opening to the second reservoir. A filter cartridge may be received by the reservoir and includes a housing body, and a filter magnet disposed within or fixedly connected to the housing body. The filter magnet and the carrier magnet are interconnected via magnetic communication upon insertion of the filter cartridge into the reservoir recess, to move the carrier and/or sluice gate valve as a result of shear force or rotational force generated between the magnets.

6 Claims, 13 Drawing Sheets

(51) Int. Cl.
  *C02F 1/00* (2023.01)
  *B01D 35/153* (2006.01)
  *C02F 1/48* (2023.01)
  *C02F 1/28* (2023.01)

(52) U.S. Cl.
  CPC ......... *H01F 7/0252* (2013.01); *H01F 7/0284* (2013.01); *B01D 2201/4046* (2013.01); *B01D 2201/4069* (2013.01); *C02F 1/283* (2013.01); *C02F 2201/006* (2013.01); *C02F 2307/04* (2013.01)

(58) Field of Classification Search
  CPC ...... C02F 1/48; C02F 1/283; C02F 2201/006; C02F 2307/04; H01F 7/0252; H01F 7/0284; H01F 7/0231
  See application file for complete search history.

(56) References Cited

U.S. PATENT DOCUMENTS

| | | |
|---|---|---|
| 3,521,216 A | 7/1970 | Tolegian et al. |
| 4,468,321 A | 8/1984 | St. John |
| 5,527,450 A | 6/1996 | Burrows |
| 6,003,734 A | 12/1999 | Oh |
| 6,638,426 B1 * | 10/2003 | Fritter .................. B01D 36/001 210/282 |
| 7,800,471 B2 | 9/2010 | Fullerton et al. |
| 7,800,473 B2 | 9/2010 | Fullerton et al. |
| 7,808,348 B2 | 10/2010 | Fullerton et al. |
| 7,808,349 B2 | 10/2010 | Fullerton et al. |
| 7,808,350 B2 | 10/2010 | Fullerton et al. |
| 7,817,006 B2 | 10/2010 | Fullerton et al. |
| 7,893,803 B2 | 2/2011 | Fullerton et al. |
| 8,098,122 B2 | 1/2012 | Fullerton et al. |
| 8,279,032 B1 | 10/2012 | Fullerton et al. |
| 8,314,671 B2 | 11/2012 | Fullerton et al. |
| 8,314,672 B2 | 11/2012 | Fullerton et al. |
| 8,461,952 B1 | 6/2013 | Fullerton et al. |
| 8,570,129 B2 | 10/2013 | Fullerton |
| 8,760,252 B2 | 6/2014 | Fullerton et al. |
| 8,872,608 B2 | 10/2014 | Fullerton et al. |
| 8,963,668 B2 | 2/2015 | Fullerton et al. |
| 9,233,322 B1 | 1/2016 | Huda |
| 10,129,667 B2 | 11/2018 | Gustafsson |
| 10,173,292 B2 | 1/2019 | Fullerton et al. |
| 2003/0221616 A1 | 4/2003 | Carpenter |
| 2003/0042191 A1 | 6/2003 | Nam et al. |
| 2010/0140521 A1 | 6/2010 | Burgess et al. |
| 2010/0212259 A1 | 8/2010 | Knieling et al. |
| 2010/0264078 A1 | 10/2010 | Bassett |
| 2011/0114862 A1 | 5/2011 | Zimmerman et al. |
| 2012/0229241 A1 | 9/2012 | Fullerton et al. |
| 2012/0242440 A1 | 9/2012 | Fullerton |
| 2013/0068673 A1 | 3/2013 | Maggiore et al. |
| 2013/0240431 A1 | 9/2013 | Foix et al. |
| 2014/0144822 A1 | 5/2014 | Whirlpool |
| 2016/0022089 A1 * | 1/2016 | Moretto ................ A47J 31/605 210/236 |
| 2016/0194229 A1 | 7/2016 | Mehdi |
| 2017/0072347 A1 | 3/2017 | Schmoll |
| 2017/0259196 A1 | 9/2017 | Foix et al. |
| 2018/0111129 A1 | 4/2018 | Adey et al. |
| 2018/0221795 A1 | 8/2018 | Bonifas et al. |
| 2018/0245429 A1 | 8/2018 | Bhadbjade |
| 2019/0039005 A1 | 2/2019 | Suthar et al. |
| 2019/0351352 A1 | 11/2019 | Chandra et al. |
| 2019/0351354 A1 | 11/2019 | Chandra et al. |
| 2020/0001211 A1 | 1/2020 | Li |
| 2021/0062559 A1 | 3/2021 | Astle |

* cited by examiner

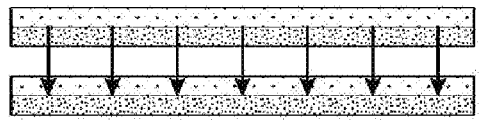 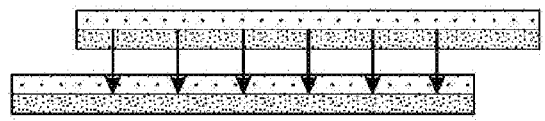
FIG. 2A
(PRIOR ART)
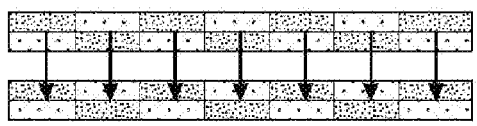 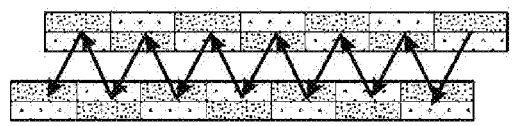
FIG. 2B
(PRIOR ART)
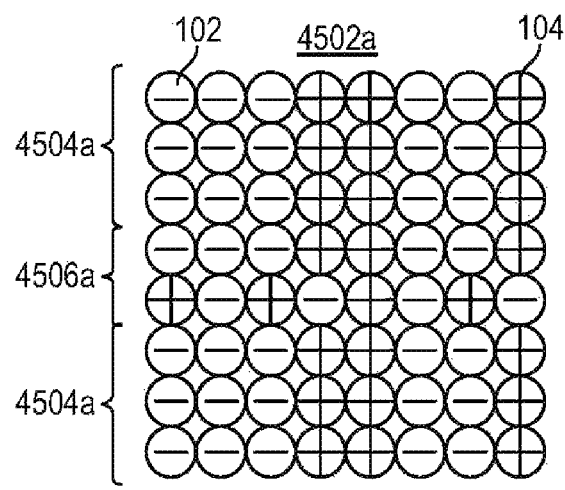 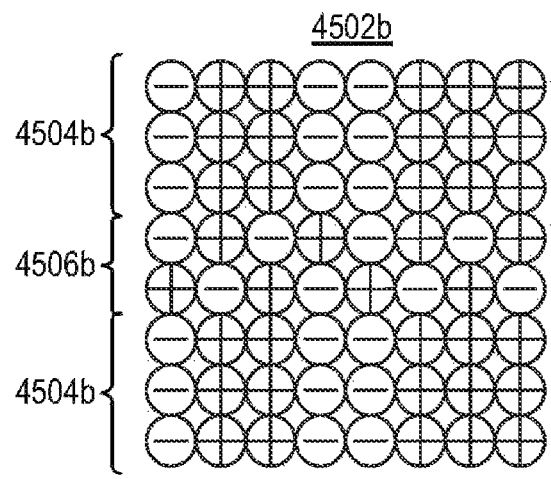
FIG. 3
(PRIOR ART)

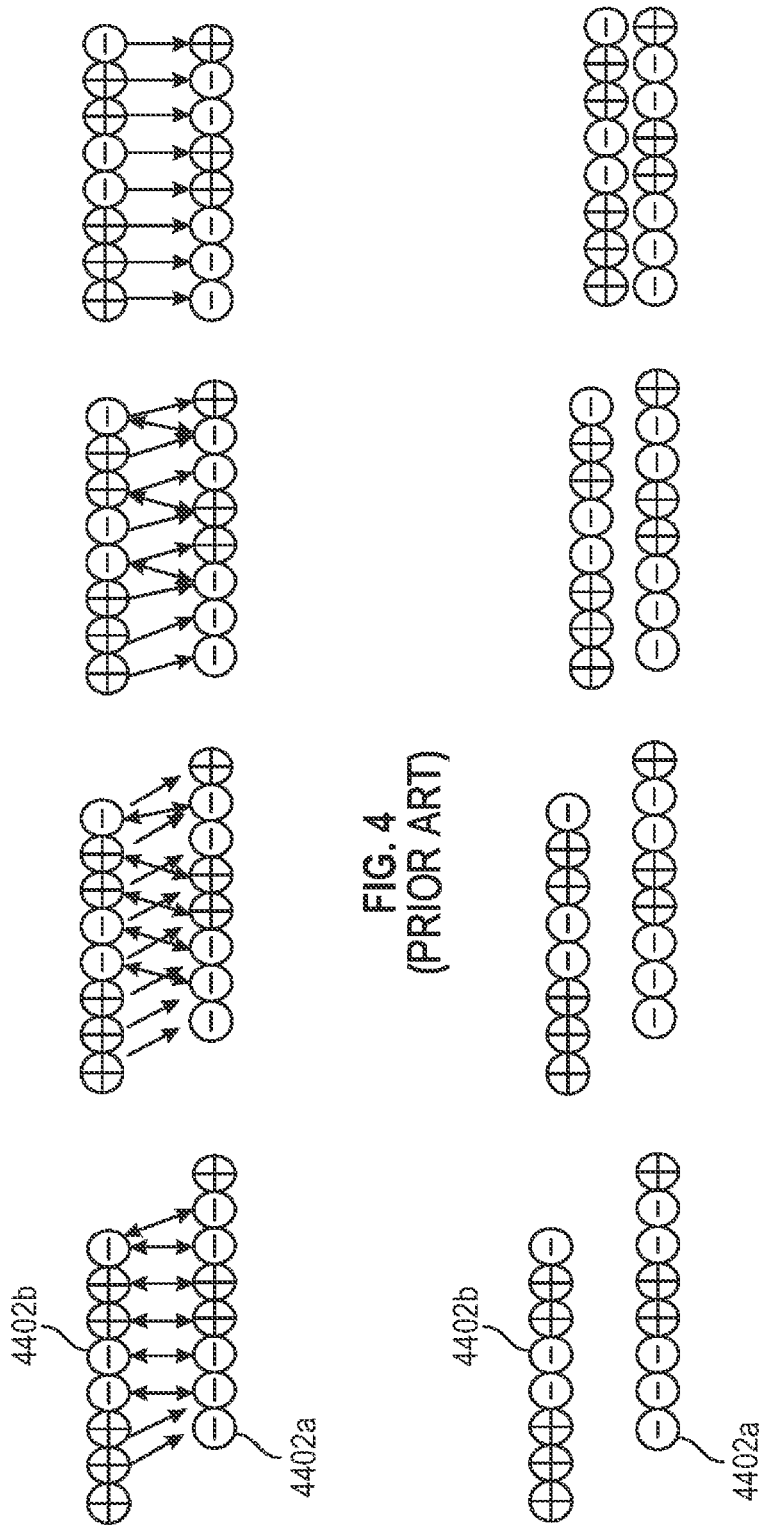

GRAVITY-FED FILTER INTERCONNECT UTILIZING CODED POLYMAGNETS

BACKGROUND OF THE INVENTION

1. Field of the Invention

The present invention relates generally to a filter interconnection scheme for use in gravity-fed filter applications, such as the interconnect between a filter cartridge and a corresponding receiving hopper for a water pitcher. The invention utilizes a correlated magnet design that encompasses coded polymagnets, and more specifically, a magnetic attraction, repulsion, or combination thereof to generate shear force. A magnetic force is introduced upon insertion of a filter cartridge into a mating water pitcher hopper to initiate magnetic interconnection. In an exemplary aspect, the interconnection scheme utilizes a magnetic shear force to allow for filter cartridge installation and filtered fluid egress flow. In another aspect, the interconnection scheme utilizes mating polymagnets on the filter cartridge and hopper, respectively, to present a rotational force to permit filter cartridge installation.

2. Description of Related Art

Correlated magnet designs were introduced in U.S. Pat. No. 7,800,471 issued to Cedar Ridge Research LLC on Sep. 21, 2010, entitled "FIELD EMISSION SYSTEM AND METHOD" (the "'471 Patent"). This patent describes field emission structures having electric or magnetic field sources. The magnitudes, polarities, and positions of the magnetic or electric field sources are configured to have desirable correlation properties, which are in accordance with a predetermined code. The correlation properties correspond to a special force function where spatial forces correspond to relative alignment, separation distance, and a spatial force function.

In U.S. Pat. No. 7,817,006, issued to Cedar Ridge Research LLC on Oct. 19, 2010, titled "APPARATUS AND METHODS RELATING TO PRECISION ATTACHMENTS BETWEEN FIRST AND SECOND COMPONENTS (a related patent to the '471 Patent), an attachment scheme between first and second components is taught. Generally, a first component includes a first field emission structure and the second component includes a second field emission structure, wherein each field emission structure includes multiple magnetic field emission sources (magnetic array) having positions and polarities relating to a predefined spatial force function that corresponds to a predetermined alignment of the field emission structures. The components are adapted to be attached to each other when the first field emission structure is in proximity of the second field emission structure.

When correlated magnets are brought into alignment with complementary or mirror image counterparts, the various magnetic field emission sources that make up each correlated magnet will align causing a peak spatial attraction force, while a misalignment will cause the various magnetic field emission sources to substantially cancel each other out. The spatial forces (attraction, repulsion) have a magnitude that is a function of the relative alignment of two magnetic field emission structures, the magnetic field strengths, and their various polarities.

It is possible for the polarity of individual magnet sources to be varied in accordance with a code without requiring a holding mechanism to prevent magnetic forces from "flipping" a magnet. As an illustrious example of this magnetic action, an apparatus 1000 of the prior art is depicted in FIG. 1A. Apparatus 1000 includes a first component 1002 and a second component 1012. The first component includes a first field emission structure 1004 comprising multiple field emission sources 1006. The second component includes a second field emission structure 1014 comprising multiple field emission sources 1016. The first and second components are adapted to attach to one another when the first field emission structure 1004 is in proximity of the second field emission structure 1014, that is, they are in a predetermined alignment with respect to one another.

The first field emission structure 1004 may be configured to interact with the second field emission structure 1014 such that the second component 1012 can be aligned to become attached (attracted) to the first component 1002 or misaligned to become removed (repulsed) from the first component. The first component 1002 can be released from the second component 1012 when their respective first and second field emission structures 1004 and 1014 are moved with respect to one another to become misaligned, causing a repulsion force.

Generally, the precision within which two or more field emission structures tend to align increases as the number N of different field emission sources in each field emission structure increases, including for a given surface area A. In other words, alignment precision may be increased by increasing the number N of field emission sources forming two field emission structures. More specifically, alignment precision may be increased by increasing the number N of field emission sources included within a given surface area A.

In U.S. Pat. No. 7,893,803 issued to Cedar Ridge Research LLC on Feb. 22, 2011, titled "CORRELATED MAGNETIC COUPLING DEVICE AND METHOD FOR USING THE CORRELATED COUPLING DEVICE," a compressed gas system component coupling device is taught that uses the correlated magnet attachment scheme discussed above.

An illustrative example of this coupling device is shown in FIG. 1B, which depicts a quick connect air hose coupling 1200 having a female element 1202 and a male element 1204.

The female element 1202 includes a first magnetic field emission structure 1218. The male element 1204 includes a second magnetic field emission structure 1222. Both magnetic field emission structures are generally planar and are in accordance with the same code but are a mirror image of one another. The operable coupling and sealing of the connector components 1202, 1204 is accomplished with sufficient force to facilitate a substantially airtight seal therebetween.

The removal or separation of the male element 1204 from the female element 1202 is accomplished by separating the attached first and second field emission structures 1218 and 1222. The male element is released when the male element is rotated with respect to the female element, which in turn misaligns the first and second magnetic field emission structures.

When conventional magnets are in close proximity, they create a force between them depending on the polarity of their adjacent faces, which is typically normal to the faces of the magnets. If conventional magnets are offset, there is also a shear force toward the alignment position, which is generally small compared to the holding force. However, multipole magnets are different. As multipole magnets are offset, attraction and repel forces combine at polarity transitions to partially cancel normal forces and create stronger shear forces.

FIGS. 2A and 2B depict a simplified graphical depiction of these forces with the arrows indicating the direction of the force exerted on the top magnet. In a conventional setting, the offset reduces the attraction with no significant shear force. The forces are primarily normal to the magnet face, as shown in FIG. 2A. As depicted in the alternating multipole magnet design of FIG. 2B, the combination of attraction and repulsion forces at the polarity transitions reduces holding force and generates a shear force.

In U.S. Pat. No. 8,279,032 (the "'032 Patent") issued to Correlated Magnets Research LLC on Oct. 2, 2012, titled "SYSTEM FOR DETACHMENT OF CORRELATED MAGNETIC STRUCTURES," a system for detaching correlated magnetic structures is taught that uses a multipole polymagnet shear force scheme as discussed above.

An illustrious example is shown in FIG. 45 of the '032 Patent (represented herein as FIG. 3), which depicts complementary codes 4502a, 4502b for polymagnets intended to produce a desirable movement behavior of two magnetic structures 4402a, 4402b.

To achieve the desired movement and shear force requirements, complementary codes 4502a, 4502b are designed that include first portions 4504a, 4504b used to achieve the desired movement behavior and second portions 4506a, 4506b used to increase shear forces, as necessary, to meet desired shear force requirements. The two codes are then used to magnetically program pairs of magnetic structures 4402a, 4402b.

FIGS. 46A to 47D of the '032 Patent (represented herein as FIGS. 4 and 5) depict attract and repel forces between each of the six rows of the first and second magnetic structures 4402a, 4402b corresponding to the first portions 4504a, 4504b of the codes used to program them, where FIGS. 46A through 46D depict the coding on the top surface of the first magnetic structure 4402a and the coding on the bottom of the second magnetic structure 4402b.

As shown in FIG. 4, when the first magnetic structure 4402a is in a first position relative to second magnetic structure 4402b, the two structures produce both repel and attract forces that combine to cause the two structures to begin to move towards the second relative position in accordance with the desired movement behavior. Specifically, five of the opposing magnetic source pairs are in a repel state and one magnetic source pair is in an attract state. A slight imbalance exists where the attract force causes the structures to pull towards the second position and the repel forces causes the structures to push away from the first position. Once the movement from the first position towards the second position begins, the attract forces increase and the repel forces decrease until the complementary magnetic sources achieve alignment and attachment at the second position. FIG. 5 depicts the vertical movement of the second magnetic structure 4402b, which becomes closer and closer to the first magnetic structure until they attach, and the vertical movement also increases the effect of the force interaction being depicted in FIG. 4.

Prior art filter interconnects present numerous technical hurdles, particularly with respect to installation, as well as removal and replacement of the filter cartridge when the filter media has served its useful life. Such technical hurdles include providing effective latching and unlatching mechanisms to retain manually-inserted filter cartridges in mating manifolds after installation, while including mechanisms such as switch-activated valve mechanisms so as to prevent the flow of water when the filter cartridge is removed for replacement. Other technical hurdles include incorporating effective authentication and/or anti-counterfeiting means to ensure that only designated filter cartridges can be installed.

Therefore, a need exists for an improved filter interconnect which overcomes these technical hurdles, without substantially increasing the cost and complexity of manufacture.

The present invention adapts the multipole polymagnet technology described above to an interconnection structure for a filter cartridge and a corresponding hopper for a water pitcher to resolve many of the technical hurdles of prior art filter interconnects.

SUMMARY OF THE INVENTION

Bearing in mind the problems and deficiencies of the prior art, it is therefore an object of the present invention to provide an improved filter interconnect structure for a filter cartridge and a corresponding hopper for a water pitcher which utilizes coded polymagnets.

It is another object of the present invention to provide an improved filter interconnect which utilizes correlated magnetism to actuate a blocking member, either directly or indirectly, to allow for the flow of ingress water or filtered egress water.

A further object of the invention is to provide an improved filter interconnect and method of installing a filter cartridge in a corresponding water filter pitcher hopper which utilizes correlated magnetism to ensure proper filter cartridge installation.

Yet another object of the present invention is to provide an improved filter interconnect which utilizes correlated magnetism to provide an effective authentication and/or anti-counterfeiting means, while ensuring proper filter cartridge installation.

Another object of the present invention is to provide a filtration system for gravity-fed applications having a first reservoir for receiving ingress fluid, the first reservoir may include a bottom surface with a recess cavity, the recess cavity including a sidewall, a longitudinal axis, and an aperture, a filter cartridge assembly receivable within the recess cavity to form a fluid-tight seal with the first reservoir, the filter cartridge assembly having a housing body, a filter media, and a filter magnet disposed within, connected to, or proximate the housing body, a second reservoir in fluid communication with the first reservoir, such that the second reservoir receives filtered fluid from the filter cartridge assembly through the recess cavity aperture, and a carrier disposed within, connected to, or proximate with, the sidewall of the recess cavity, and slideably moveable between a first position where fluid is not permitted to egress said aperture and a second position where fluid flows through the aperture to the second reservoir, the aperture being blocked when the carrier is in the first position, the carrier comprising a carrier magnet, wherein the filter magnet and carrier magnet are in magnetic communication upon insertion of the filter cartridge assembly into the recess cavity, the magnetic communication causing the carrier to move from the first position wherein the aperture is blocked to the second position, opening the aperture to fluid flow.

The filter cartridge housing body and the recess cavity may be cylindrical, the filter cartridge housing body may include a radius smaller than a radius of the recess cavity, such that the filter cartridge housing body may be insertable within the recess cavity.

The carrier may operate as a sluice gate valve.

The carrier, under a magnetic shear force, may be slideably moveable approximately parallel to the longitudinal axis of the filter cartridge from the first position to the second position.

The filter magnet and the carrier magnet may comprise coded polymagnets.

The polarity transitions of the filter magnet may be aligned with polarity transitions of the carrier magnet, such that a magnetic shear force may be generated therebetween when the filter cartridge is inserted within the recess cavity, and wherein the magnetic shear force causes the carrier to move from the first position to the second position.

The carrier can include a stop such that, when the carrier is in the second position due to the magnetic communication between the carrier magnet and the filter magnet, a positive tactile feedback to a user results.

The filter magnet may be a correlated magnet having a plurality of magnetic field emission sources configured to be aligned with a plurality of magnetic field emission sources of the carrier magnet, and the carrier magnet may be a correlated magnet having a plurality of magnetic field emission sources, such that a magnetic shear force is generated between the magnets when the filter cartridge is approximately fully inserted within the recessed cavity.

The first and second reservoirs and the filter cartridge may further be components of a water filter carafe for point-of-use water filtration.

The carrier may include a carrier magnet holder and the carrier magnet. Additionally, the magnetic communication created may result in a net force strong enough to hold the filter cartridge within the recess cavity to assist in forming the fluid-tight seal, but may still be removable by an end user.

Yet another object of the present invention is to provide a filter cartridge for use in a gravity-fed filtration system, the filter cartridge comprising a housing having a body with a sidewall, a top, and a bottom, and a longitudinal axis, a filter media disposed within the housing body, and a filter magnet disposed proximate to the housing body sidewall.

The filter magnet may be connected to the housing body sidewall.

The filter magnet may be fixed within the housing body sidewall.

The filter cartridge housing body sidewall and/or bottom may include a plurality of configured apertures for directing a filtered egress water outflow.

The filter magnet may comprise a coded polymagnet.

The coded polymagnet may be a correlated magnet having a plurality of magnetic field emission sources, such that a magnetic shear force is generated between the filter magnet and a corresponding coded magnet when the filter cartridge is inserted within a receiving holder containing the corresponding coded magnet.

A further object of the invention is to provide a filtration system for gravity-fed applications comprising a first reservoir for receiving ingress fluid, the first reservoir having a bottom surface with a recess having a receiving cavity, the receiving cavity including a sidewall, a bottom portion, and an aperture, a filter cartridge having a top end portion, a bottom end portion, a sidewall, and a longitudinal axis, the filter cartridge receivable within the recess receiving cavity and forming a seal at the filter cartridge top end portion, and with an aperture proximate the bottom end portion and/or the filter cartridge sidewall, the filter cartridge having a filter magnet disposed within, connected on, or proximate to, the bottom end portion of the filter cartridge, a second reservoir in fluid communication with the first reservoir, such that the second reservoir receives filtered fluid from the first reservoir via the filter cartridge, and a carrier disposed within the recess receiving cavity bottom portion and moveable between a first position where fluid is not permitted to egress the first reservoir and a second position where fluid may egress the first reservoir to the second reservoir, such that the carrier forms a blocking member for slidably blocking the recess receiving cavity aperture, or is in mechanical communication with a blocking member for slidably blocking the recess receiving aperture, the carrier comprising a carrier magnet, wherein the filter magnet and carrier magnet are in magnetic communication, such that when the magnets are in close proximity the carrier is moved from the first position where fluid is not permitted to egress the recess receiving cavity aperture, to the second position where fluid may egress the recess receiving cavity aperture, as a result of a magnetic shear force generated by the filter magnet and the carrier magnet.

The carrier may be rotatable in a plane perpendicular to the longitudinal axis, from the first position to the second position as a result of the magnetic shear force.

The filtration system may further comprise a resilient member to bias the carrier in the first position.

The carrier may include a carrier magnet holder and the carrier magnet.

The filter cartridge may have a cylindrical body and the recess receiving cavity may be cylindrical, the filter cartridge cylindrical body having a radius smaller than a radius of the recess receiving cavity.

The carrier may operate as a sluice gate valve.

The filter magnet and the carrier magnet may each comprise coded polymagnets.

The polarity transitions of said filter magnet may be aligned with the polarity transitions of the carrier magnet such that the shear force may be generated between the filter magnet and the carrier magnet when the filter cartridge is received by the recess receiving cavity, and wherein the shear force may cause the carrier to rotate from the first position to the second position.

A further objective of the present invention is to provide a filter cartridge for use in a gravity-fed filtration system, the filter cartridge comprising a housing having a body, a top end portion, a bottom end portion, and a central longitudinal axis a filter media disposed within the housing body, and a filter magnet disposed on, within, or in close proximity of, the bottom end portion, wherein the filter magnet includes a coded polymagnet.

The filter magnet may be fixed with respect to the housing body, such that upon insertion of the filter cartridge into a recess in a bottom surface of a filter reservoir, the filter magnet is placed in close proximity to a carrier having a carrier magnet when the filter cartridge is inserted into the recess, the carrier rotatable as a result of magnetic communication between the filter magnet and the carrier magnet, wherein upon rotation filtered water is allowed to flow from the filter cartridge to a receiving reservoir.

Yet another object of the present invention is to provide a method of initiating fluid flow from a filter cartridge to a holding reservoir for a gravity-fed filtration system, comprising providing the filter cartridge having a filter magnet, providing a holding reservoir for filtered fluid, providing a first reservoir having a recess receiving cavity in a bottom surface thereof for receiving ingress fluid, wherein the recess receiving cavity includes an aperture and carrier magnet moveable between a first position and a second position, the carrier magnet proximate the aperture, inserting the filter cartridge into the recess receiving cavity, moving the filter magnet to be in close proximity to the carrier magnet such that the filter magnet and the carrier magnet are in magnetic communication with one another to create a magnetic force, shifting the carrier magnet by the magnetic force to move the carrier magnet from the first position, initiating the blocking of fluid flow, to the second position, and allowing for fluid flow to the holding reservoir.

The magnetic force may comprise a shear force.

The carrier magnet may move in a direction approximately parallel to a longitudinal axis of the filter cartridge from the first position to the second position.

The carrier magnet may move in a direction approximately perpendicular to a longitudinal axis of the filter cartridge from the first position to the second position.

The carrier magnet may rotate in a plane perpendicular to the longitudinal axis of the filter cartridge.

The filter magnet and carrier magnet may each comprise coded polymagnets.

The step of aligning the filter magnet with the carrier magnet may comprise aligning polarity transitions of the filter magnet with polarity transitions of the carrier magnet to create the magnetic force.

Still another object of the present invention is to provide a method of initiating fluid flow from a filter cartridge to a holding reservoir for a gravity-fed filtration system, comprising providing the filter cartridge having a bottom portion and a filter correlated polymagnet, providing a holding reservoir for filtered fluid, providing a first reservoir having a recess receiving cavity in a bottom surface thereof for receiving ingress fluid, the recess receiving cavity having a bottom portion with a movable carrier including a correlated polymagnet attached within, connected to, or proximate therewith, a sidewall, an aperture proximate the cavity bottom portion, inserting the filter cartridge into the recess receiving cavity, forming a magnetic shear force by bringing the filter cartridge correlated polymagnet in close proximity to the movable carrier correlated polymagnet, and moving the carrier by the magnetic shear force away from the aperture to allow for fluid flow from the filter cartridge to the holding reservoir.

The step of forming a magnetic shear force may include aligning polarity transitions of the filter cartridge correlated polymagnet with polarity transitions of the moveable carrier correlated polymagnet.

The magnetic shear force may translate to rotational motion of the movable carrier.

The carrier magnet may move perpendicular to a longitudinal axis of the filter cartridge from the first position to the second position.

The carrier magnet may rotate about a longitudinal axis of the filter cartridge from the first position to the second position.

Still other objects and advantages of the invention will in part be obvious and will in part be apparent from the specification.

The above and other objects, which will be apparent to those skilled in the art, are achieved in the present invention which is directed to a gravity-fed filtration system interconnection structure comprising a reservoir for receiving ingress fluid, the reservoir having a bottom surface with a recess for receiving a filter cartridge body, and an opening for filtered fluid egress to a second, dispensing reservoir. A carrier or shuttle having a magnet disposed within or connected to the carrier is adjacent to the reservoir recess and connected to a sluice gate valve which normally blocks the opening to the second reservoir. The interconnection structure further includes a filter cartridge having a housing body, and a filter magnet disposed within or fixedly connected to the housing body. The carrier is normally biased in a first position, such as a closed position, and is moveable between the first position and a second (open) position, and the filter magnet and the carrier magnet are interconnected via magnetic communication upon insertion of the filter cartridge into the reservoir recess, such that upon relative movement of the filter magnet and carrier magnet into an alignment position, the carrier moves to the second position as a result of the magnetic communication. In one embodiment, the carrier translates axially upwards within a cavity in the reservoir recess sidewall as a result of the magnet communication. In another embodiment, the carrier shifts radially in a direction perpendicular to the longitudinal axis of the filter cartridge body. In still another embodiment, the carrier rotates about the longitudinal axis of the filter cartridge. The filter magnet polarity transitions are aligned with the carrier magnet polarity transitions such that a shear force or rotational force is generated between the magnets when the filter cartridge is inserted within the reservoir recess, causing the carrier to move from the first position to the second position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2A depicts exemplary attraction/repulsion forces for conventional magnets intended to produce a desirable movement behavior of two magnetic structures;

FIG. 2B depicts exemplary attraction/repulsion forces for complementary codes for polymagnets intended to produce a desirable movement behavior of two magnetic structures;

FIG. 3 depicts exemplary complementary codes for an array of polymagnets of the prior art intended to produce a desirable movement behavior of two magnetic structures;

FIG. 4 depicts the relative movement of two magnetic structures utilizing the complementary polymagnet codes of the prior art of FIG. 3, wherein the complementary polymagnet codes produce both repel and attract forces that combine to cause the two structures to move from a first relative position to a second relative position in accordance with desired movement behavior;

FIG. 5 depicts the magnetic structure of FIG. 4, wherein the two magnetic structures move towards one another in accordance with the desired movement behavior;

DESCRIPTION OF THE EMBODIMENT(S)

Figure 1A:
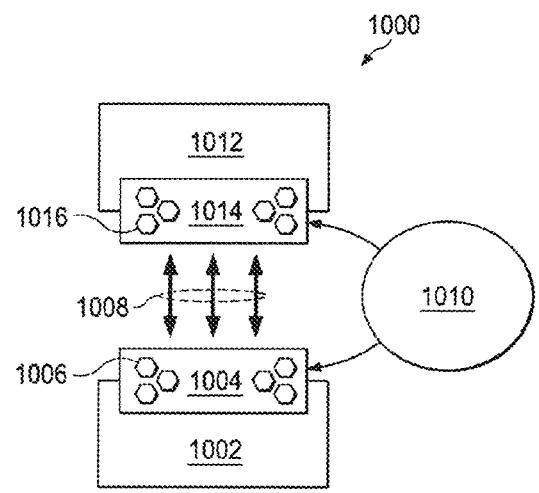
FIG. 1A depicts an apparatus of the prior art having two components magnetically attached to one another.
Figure 1B:
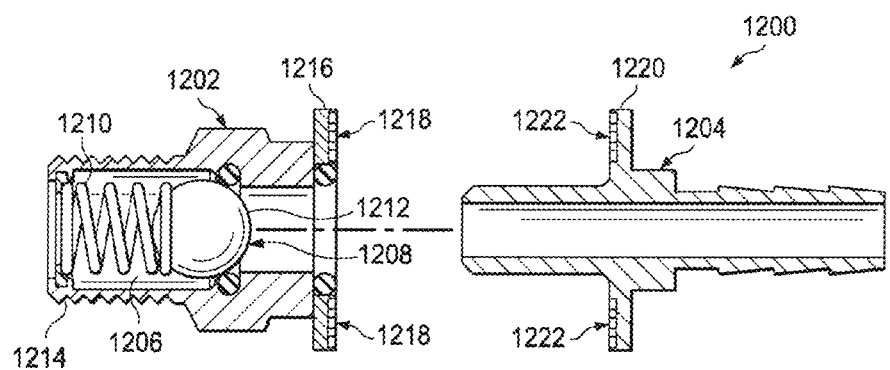
FIG. 1B depicts a quick connect air hose coupling of the prior art showing placement of correlated magnets for attachment.

In describing the embodiments of the present invention, reference will be made herein to FIGS. 1-27 of the drawings in which like numerals refer to like features of the invention.

Certain terminology is used herein for convenience only and is not to be taken as a limitation of the invention. For example, words such as "upper," "lower," "left," "right," "horizontal," "vertical," "upward," "downward," "clockwise," and "counterclockwise," "longitudinal," "lateral," or "radial", or the like, merely describe the configuration shown in the drawings. Indeed, the referenced components may be oriented in any direction and the terminology, therefore, should be understood as encompassing such variations unless specified otherwise. For purposes of clarity, the same reference numbers will be used in the drawings to identify similar elements.

Additionally, in the subject description, the words "exemplary," "illustrative," or the like, are used to mean serving as an example, instance or illustration. Any aspect or design described herein as "exemplary" or "illustrative" is not necessarily intended to be construed as preferred or advantageous over other aspects or design. Rather, the use of the words "exemplary" or "illustrative" is merely intended to present concepts in a concrete fashion.

Correlated magnets contain areas of alternating poles. These patterns of alternating poles can concentrate and/or shape magnetic fields to give matching pairs of magnets unique properties. The present invention utilizes correlated magnet designs with "high auto-correlation and low cross-correlation" which is a characteristic of correlated magnets which only achieve peak efficacy (magnet attraction or repulsion) when paired with a specific complementary magnet. An example of such use of correlated magnets is disclosed in U.S. Pat. No. 8,314,671 issued to Correlated Magnets Research LLC on Nov. 20, 2012, entitled "KEY SYSTEM FOR ENABLING OPERATION OF A DEVICE." Correlated magnets are also characterized by dense and tunable magnetic fields, allowing for specifically engineered force curves with higher force at shorter working distances.

The present invention utilizes multipole polymagnets, such as Alignment Polymagnets, which are pairs of multipole magnets with a defined correlation in the codes that describe their polarity regions. As the relative position of the magnets is changed, particularly the linear offset of the magnets, the interaction between the polarity regions on the magnets creates different net holding force (normal to the magnet faces) and shear force (parallel to the faces). Because of the correlation properties of these codes, they have strong forces when they are relatively close to alignment but weak forces elsewhere. This allows the design of systems where the magnetic forces can largely be neglected until the magnets have a relatively low offset from their alignment position. These characteristics give better working range, reduced possibility of misalignment, and improved user experience.

The present invention utilizes a coded polymagnet shear force model applied to a filter interconnect for gravity-fed filter applications. Most countertop dispensers are gravity-fed pitcher designs. Typically, they consist of a two-stage reservoir system with unfiltered water traversing from a first (top) reservoir through a filter media to a second (lower) dispensing reservoir. These are generally simple designs that do not include flow control or shut-off mechanisms between reservoirs, and thus do not attempt to provide a more efficient filtering scheme, or maximize the amount of water being filtered at any one time. Filtered water filter containers, such as jugs or pitchers, generally comprise a receptacle and a removable hopper, which hopper can be supported in or on the receptacle. The hopper is adapted to carry a water filter cartridge which typically comprises a molded container having inlet and outlet slots or ports formed therein to allow water to enter and exit an internal cavity. The filter media is usually of granular activated carbon or pleated fiber sheets, with at least one inlet at the filter housing top and at least one outlet at the filter housing bottom, which allows water to flow from the upper reservoir to the lower reservoir.

Integral to the present design is a matching set of "keyed" correlated magnets disposed in/on the filter cartridge housing and hopper, respectively, which provide the initial drive to engage the filter cartridge during installation and to actuate a blocking component, such as for example a sluice gate valve, diaphragm valve, butterfly valve, plug valve or any other valve design known in the art, to allow for filtered egress fluid flow into the bottom dispensing reservoir. Embodiments of the present invention described herein illustrate the actuation of a downstream valve (e.g., gate valve, spool valve, or other valve design) to allow for the flow of water; however, it should be understood by those skilled in the art that actuation of a valve is only one example of an application of coded polymagnets which is intended to be within the scope of the present invention, and that other applications of coded polymagnets to affect water flow as part of a filter interconnect are not precluded.

Engagement may be accomplished by having a pair of magnets, preferably correlated magnets, oriented parallel to one another on each component of the connecting pair when in alignment, wherein a first magnet is disposed on a filter cartridge and a complementary magnet is located in or on the hopper and designed to secure the filter into position. It should be understood by those skilled in the art that a "correlated magnet" or "polymagnet" as referred to herein may comprise a single magnet with a plurality of polarity regions or alternatively may comprise multiple magnets arranged to create a polarity pattern with the desired characteristics. In at least one embodiment, a thin layer of material may be introduced, physically separating the two magnets so they cannot have physically contacting surfaces, but they can still magnetically communicate with one another when in a desired operating proximity.

In at least one embodiment, when a correct set of "keyed" magnets are aligned and brought into an effective working distance, the result is a shear force generated between the two magnets. The magnet disposed on the filter cartridge is fixed; however the corresponding hopper magnet is held within a magnet holder or carrier which allows the hopper magnet to translate axially or radially, or to rotate, as a result of the shear force acting against the mechanical force of a resilient member. This motion may be employed to actuate a valve or move a blocking component that would otherwise prohibit installation and/or removal. The resilient member can be, for example, a coil spring, a torsion spring, a spring clip, a rubber grommet, or any other elastic material known in the art. Similarly, the actuation valve can be of any form to block fluid egress, for example a sluice gate, diaphragm, plug or any other design known in the art to prevent the flow of fluid. As will be described in more detail below, the force curves of the resilient member and correlated magnet couple are engineered such that only a set of corresponding "keyed" magnets will provide sufficient magnetic shear force to overcome the spring force holding the magnet holder or carrier in the "home" or blocking position.

It should be understood by those skilled in the art that the embodiments of the present invention described herein, which utilize polymagnets coded to generate a magnetic shear force to actuate a valve and/or to move a magnet holder/carrier or blocking mechanism, are only exemplary methodologies for incorporating coded polymagnets to an interconnection structure for a filter cartridge and a corresponding hopper, and that the direct or indirect actuation of a valve or blocking mechanism may alternatively be achieved through polymagnets coded for magnetic attraction or repulsion. An example of the use of polymagnets coded for magnetic repulsion in a filter interconnect is disclosed in U.S. Patent Application No. 62/849,525 filed May 17, 2019 to one or more of the inventors herein, titled "FILTER INTERCONNECT UTILIZING CORRELATED MAGNETIC ACTUATION FOR DOWNSTREAM SYSTEM FUNCTION," the entire disclosure of which is incorporated herein by reference.

Referring now to FIGS. 6-12, collectively, an exemplary filter interconnect utilizing coded polymagnets in accordance with the present invention is shown. In this embodiment, mating polymagnets are coded to generate sufficient shear force to actuate a valve when the polymagnets are in a desired alignment and proximity. Shown in the figures is a perspective, cross-sectional view of a gravity-fed pitcher design consisting of a receptacle and a removable hopper supported in or on the receptacle. The hopper is adapted to carry a water filter cartridge which typically comprises a molded container having inlet and outlet slots formed therein to allow water to enter and exit an internal cavity. Unfiltered water traverses from the top reservoir, through the filter cartridge media, to a lower dispensing reservoir (not shown). For clarity, all figures described and shown herein depict only the upper reservoir, hopper, and filter cartridge of an otherwise conventional water pitcher structure, and it should be understood by those skilled in the art that filtered egress fluid would be received in a bottom reservoir for dispensing.

Figure 6:
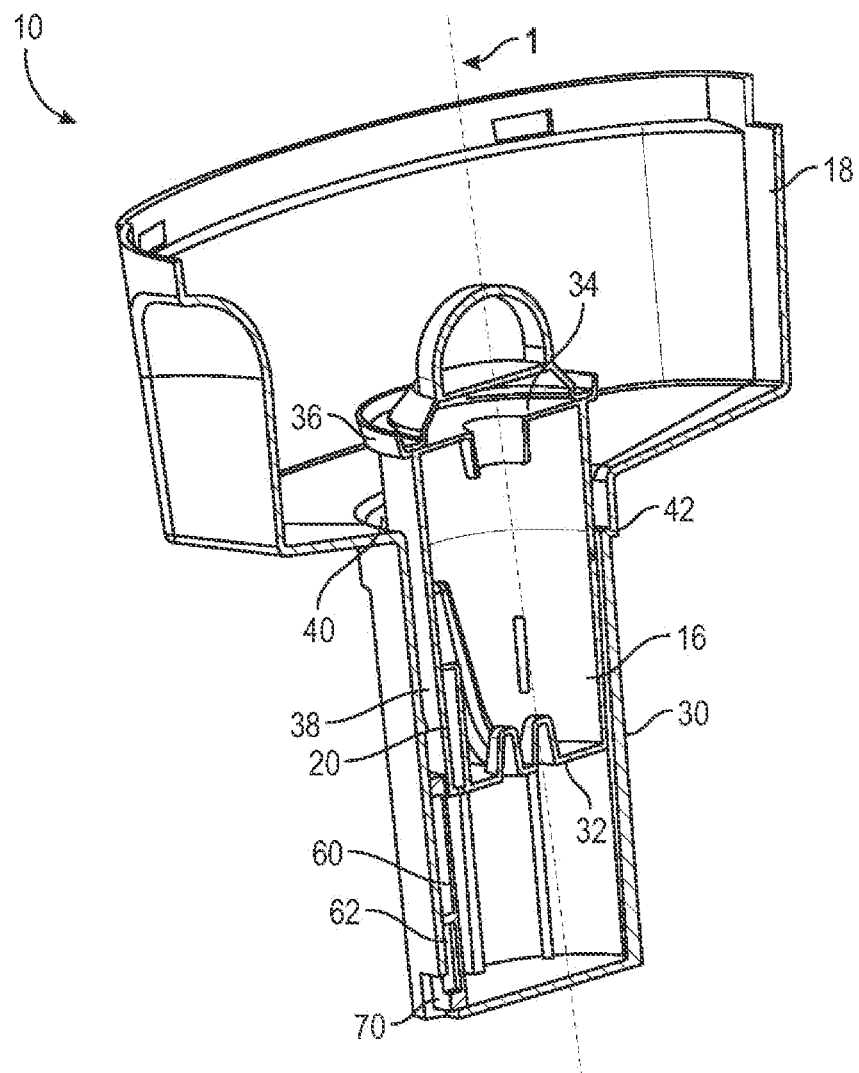
FIG. 6 depicts a perspective, cross-sectional view of one embodiment of the filter cartridge and pitcher according to the present invention, just prior to insertion of the filter cartridge. In this embodiment, the polymagnets are positioned to present a shear force in an axial direction parallel to the longitudinal axis of the filter cartridge.

As shown in FIG. 6, hopper 18 includes an approximately circular aperture 40 for receiving and supporting an otherwise conventional, slidably insertable filter cartridge assembly 16. Filter assembly 16 may be a sediment filter for removing larger particles from the unfiltered water upon initial filling of upper reservoir or hopper 18, or a treated activated carbon paper filter for removing unwanted microbes or microorganisms. Filter assembly 16 may include a cylindrically shaped housing body 30 having a radius slightly smaller than the radius of aperture 40 to allow for easy insertion in aperture 40 of hopper 18. The top cap 34 of cylindrical housing body 30 may include an extended circumferential lip 36 that rests on circular shelf 42 of hopper 18, which defines aperture 40. In this manner, cylindrical housing body 30 can be slidably inserted within aperture 40 and held in place and supported by circumferential lip 36 fitting on shelf 42.

Filter assembly 16 includes at least one, or more likely a plurality of, fluid ingress port(s) or aperture(s) (not shown, for clarity) to allow fluid to flow into the filter assembly and through the enclosed filter media, when the filter housing top cap 34 is at least partially, or more likely, completely submerged, in fluid. The aperture(s) may be any shape (circular, rectangular, etc.) provided there are sufficient openings for fluid ingress. Fluid enters through the top aperture(s) and is directed through the filter media and then outwards through the egress aperture(s), to the bottom reservoir. For a gravity-fed filtration system, it is only necessary that an egress aperture(s) be available in housing bottom cap 32 to allow for filtered egress water outflow; however it should be understood that the present invention may also utilize filter cartridge housings such as those which include radially-configured apertures in the sides of the filter housing for directing filtered egress water outflow.

Embedded in the wall 38 of housing body 30 is a first coded polymagnet 20, which is in a fixed position.

Figure 7:
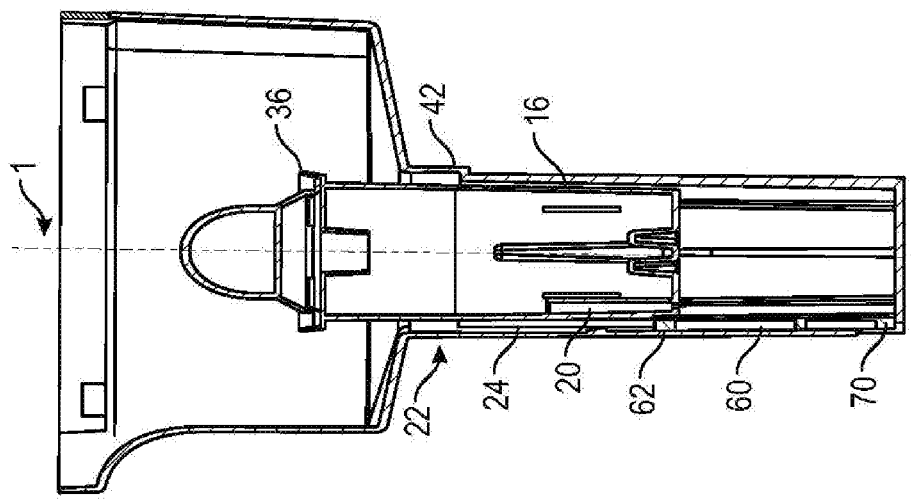
Figure 10:
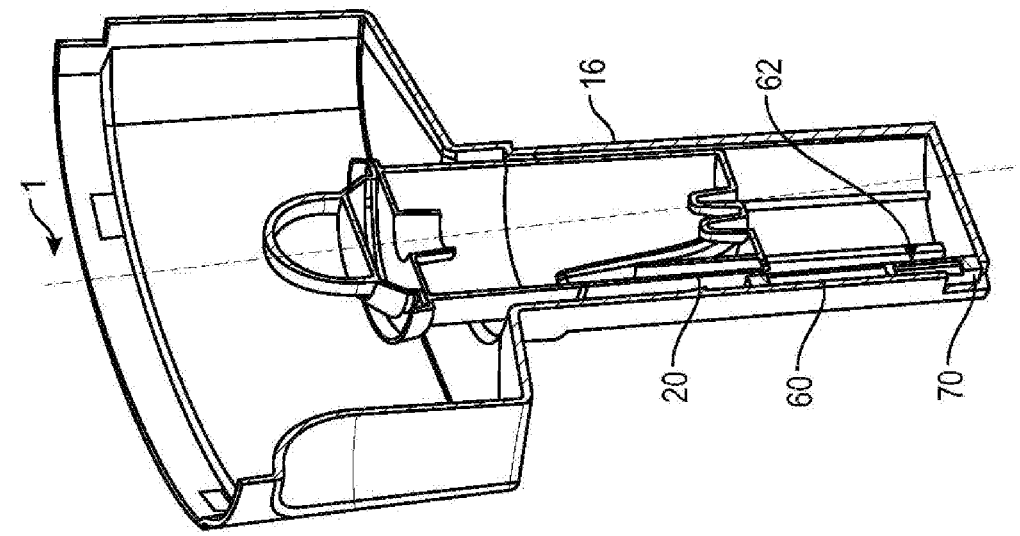

As best seen in FIG. 7, hopper wall 22 includes a recessed cavity 24 within which magnet holder or carrier 62 with correspondingly-mated coded polymagnet 60 is received on a sidewall of the cavity 24. As shown in FIGS. 7 and 10, magnet holder or carrier 62 is normally in a "home" position and blocking component 70 is closed, restricting water flow to the lower, dispensing reservoir.

Figure 8:
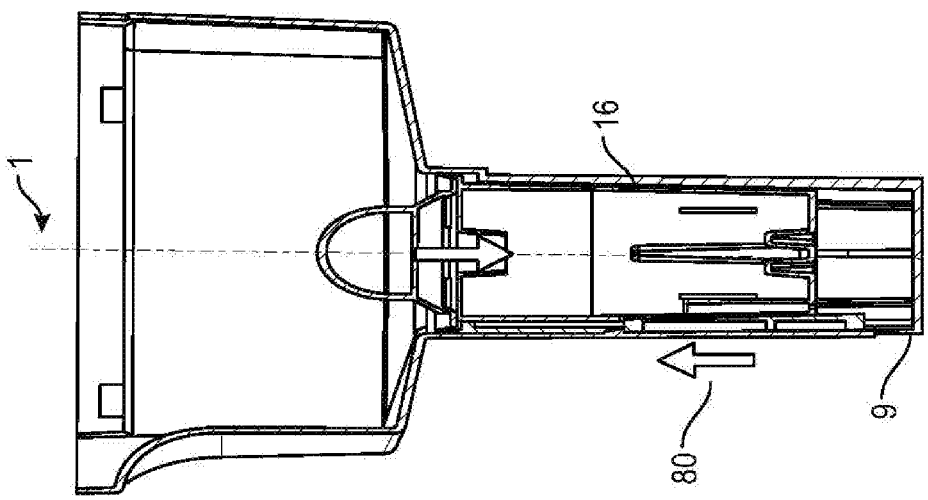
Figure 11:
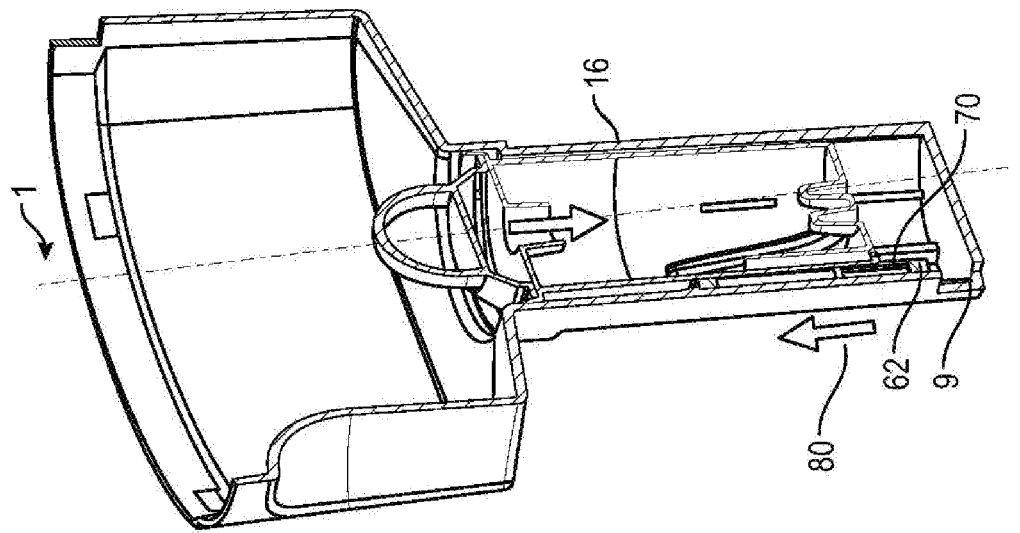

The mating polymagnets 20, 60 are coded such that attractive and repulsive forces combine at the polarity transitions to partially cancel normal forces and to create shear forces in accordance with a desired movement behavior. As shown in FIGS. 8 and 11, when filter assembly 16 is fully inserted within hopper 18, the polymagnets 20, 60 are in a desired alignment and proximity position, such that the polymagnets produce both repulsive and attractive forces that combine to form a shear force in the axial direction, causing magnet holder/carrier 62 to move approximately parallel to the longitudinal axis 1 of filter assembly/cartridge 16 or axially upwards within cavity 24 towards a second (open) position in accordance with the desired movement behavior. Generally, more of the opposing magnetic source pairs are in a repel state than magnetic source pairs are in an attract state. As the filter assembly 16 and magnet 20 moves toward the alignment position, a slight imbalance exists where the accumulative attraction forces cause the magnet holder 62 to pull towards the filter magnet and the accumulative repulsion forces cause the magnet holder to push away from the alignment position. As the filter magnet 20 reaches the alignment position and the coded polymagnets are in operating proximity, the repulsion forces increase and the attraction forces decrease until the complementary magnetic sources achieve alignment and full repulsion at the second position, generating sufficient shear force to move the magnet holder 62 axially upwards in the direction of arrow 80 to open blocking component 70, and allow fluid to flow through egress aperture 9.

When filter assembly 16 is installed, the shear force generated between magnets 20, 60 further acts to maintain the filter cartridge in the fully-installed position, as the magnet holder 62 remains in the open position while the magnetic shear force effectively "pushes" the filter assembly 16 downwards securing the installed position. In at least one embodiment, movement of magnet holder 62 in the upwards axial direction is blocked by a position stop at a predetermined distance, effectively acting as a magnetic "latch" to hold the filter assembly 16 in the fully-installed position as a result of the shear force generated. An advantage of this configuration is that the magnetic communication between magnets 20, 60 provides positive, tactile feedback to the user in the form of a magnetic "latch," indicating proper sealing.

Figure 9:
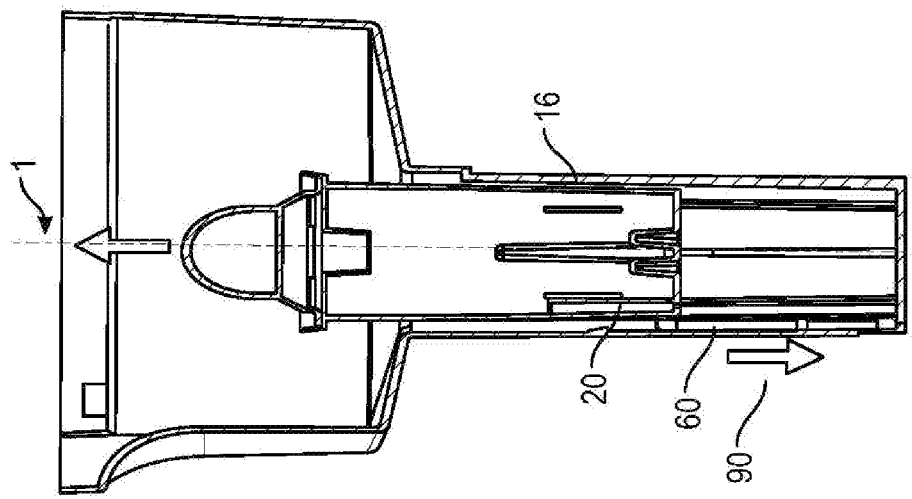
FIGS. 7-9 depict plan, cross-sectional views of the filter cartridge and pitcher of FIG. 6, showing the interaction of the correlated magnets from just prior to insertion of the filter cartridge, through installation and removal.
Figure 12:
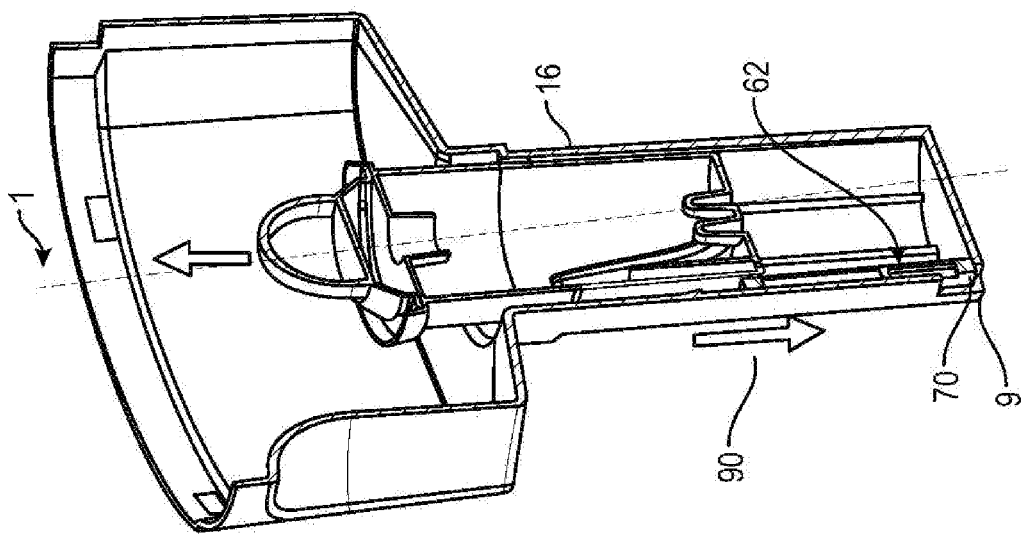
FIGS. 10-12 depict perspective, cross-sectional views of the filter cartridge and pitcher of FIGS. 7-9 respectively, showing the interaction of the correlated magnets from just prior to insertion of the filter cartridge, through installation and removal.

As shown in FIGS. 9 and 12, pulling the filter cartridge upwards overcomes the generated shear force in the opposing direction, and causes the magnets 20, 60 to misalign, which initiates magnet holder 62 to fall back under gravitational force into the "home" position, as shown by arrow 90, and thus closing blocking component 70. In this position, the aperture 9 is blocked by blocking component 70 and fluid is not permitted to egress aperture 9.

The filter interconnect of the present invention further presents authentication and anti-counterfeiting advantages, insomuch that if the filter cartridge did not include a correspondingly coded polymagnet, or did not include a magnet at all, the magnet holder/carrier would not move and would remain in the "home" position, as shown in FIG. 7, and blocking component 70 would remain closed, restricting filtered egress water flow through aperture 9 to the lower, dispensing reservoir.

Figure 13:
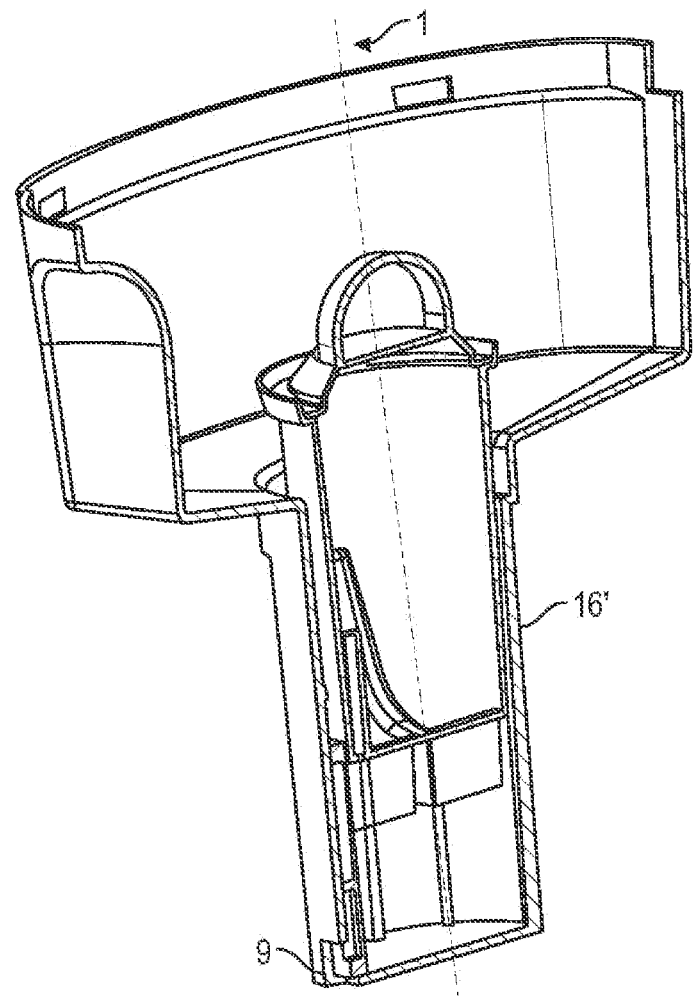
FIG. 13 depicts a cross-sectional view of another embodiment of the filter cartridge and pitcher of the present invention, wherein the filter cartridge has an extended or elongated filter housing. The polymagnets are positioned to present a shear force in an axial direction parallel to the longitudinal axis of the filter cartridge, similar to the embodiment shown in FIG. 6.

FIG. 13 depicts a cross-sectional view of another embodiment of the filter assembly and pitcher of the present invention, wherein the filter assembly 16' has an extended or elongated filter housing and the polymagnets are positioned to present a shear force in an axial direction parallel to the longitudinal axis 1 of the filter cartridge in a similar manner as in the embodiment shown in FIGS. 6-12.

Referring now to FIGS. 14-20, collectively, another embodiment of a filter interconnect of the present invention is shown, wherein the polymagnets are positioned to present a shear force in a lateral or radial direction, perpendicular to the longitudinal axis 1 of the filter cartridge.

Figure 14:
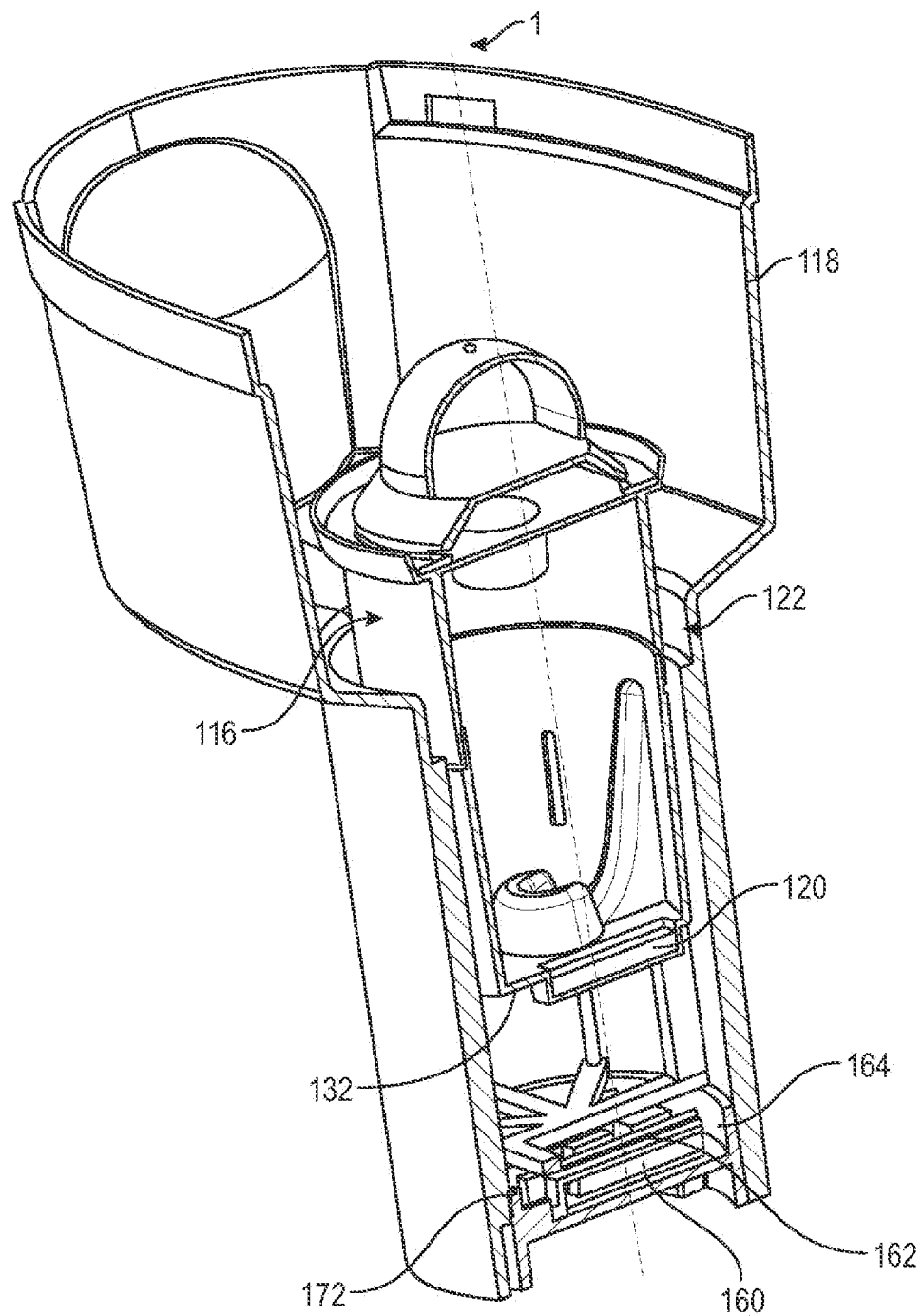
FIG. 14 depicts a perspective, cross-sectional view of yet another embodiment of a filter cartridge and pitcher according to the present invention, prior to insertion of the filter cartridge. In this embodiment, the polymagnets are positioned to present a shear force in a lateral or radial direction, perpendicular to the longitudinal axis of the filter cartridge.
Figure 15:
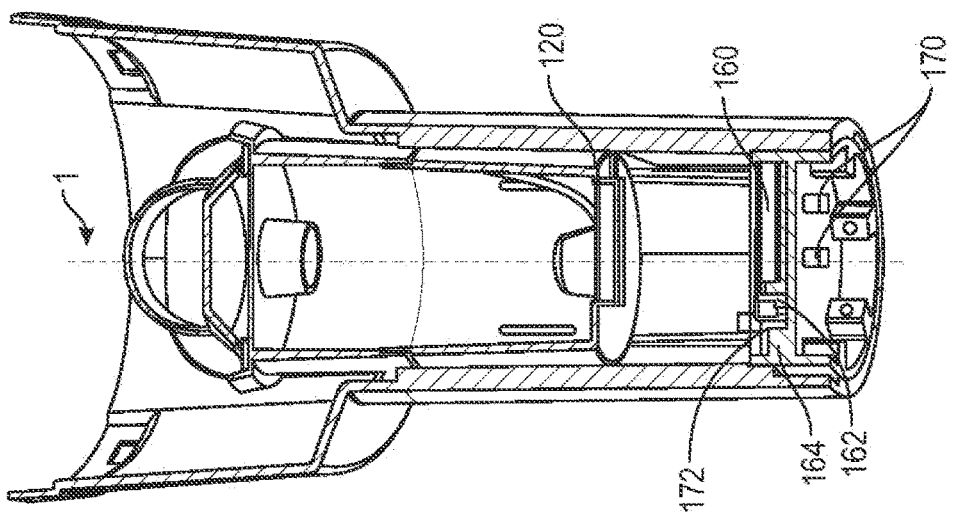
Figure 18:
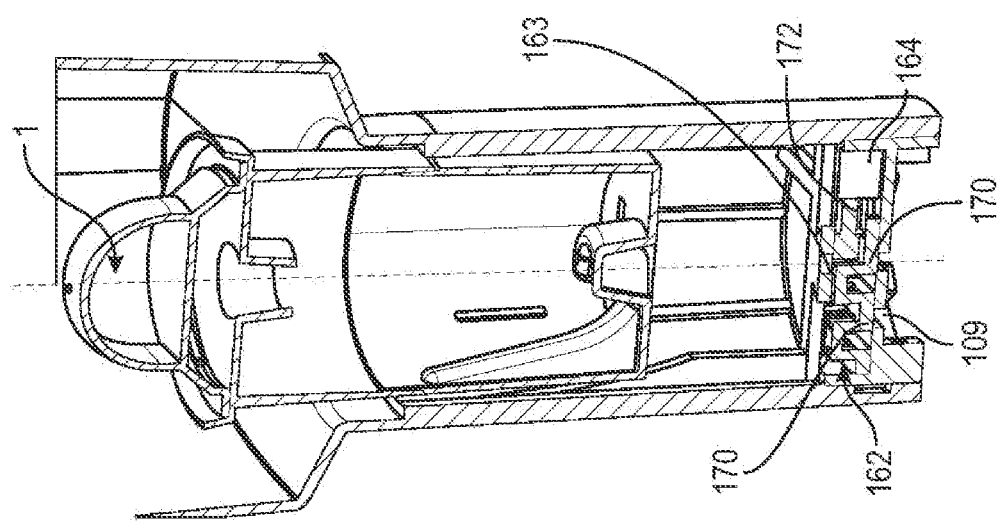

In this embodiment, as best seen in FIG. 14, polymagnet 120 is fixed on the underside of filter cartridge assembly housing base cap 132 of filter cartridge 116. Hopper 118 includes a magnet holder 164 fixedly positioned at the base of receiving cavity or cylindrical recess 122, and a magnet carrier 162 which is linearly translatable within holder 164 in a direction perpendicular to the longitudinal axis 1 of the filter cartridge 116, and normally biased in a "home" or blocking position by resilient member 172. When in the "home" position, as shown in FIGS. 15 and 18, blocking component 170 of carrier 162 blocks one or more apertures 109, restricting filtered egress fluid flow to the bottom reservoir of the gravity-fed pitcher. Disposed within magnet carrier 162 is a correspondingly coded polymagnet 160 for mating with polymagnet 120 positioned on the underside of filter cartridge 116.

Figure 16:
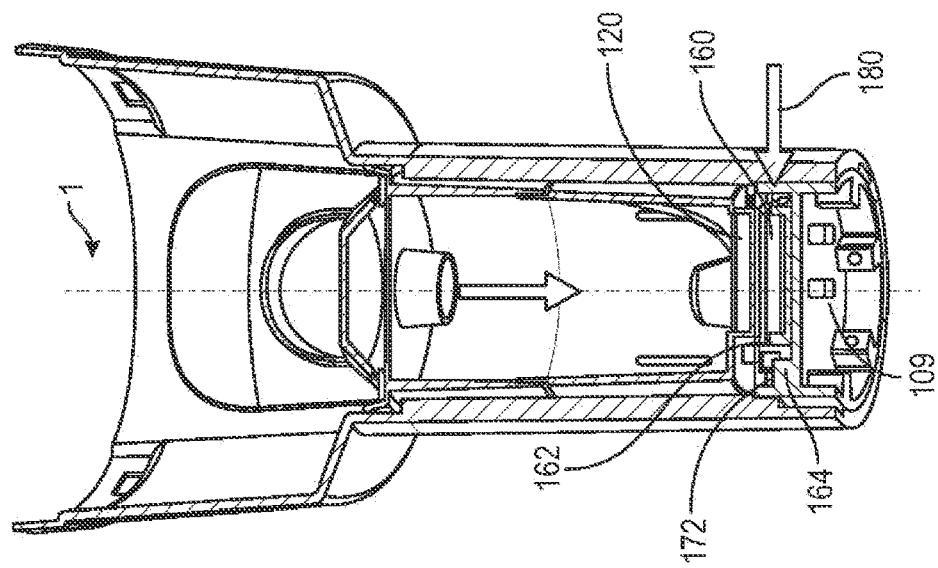
Figure 19:
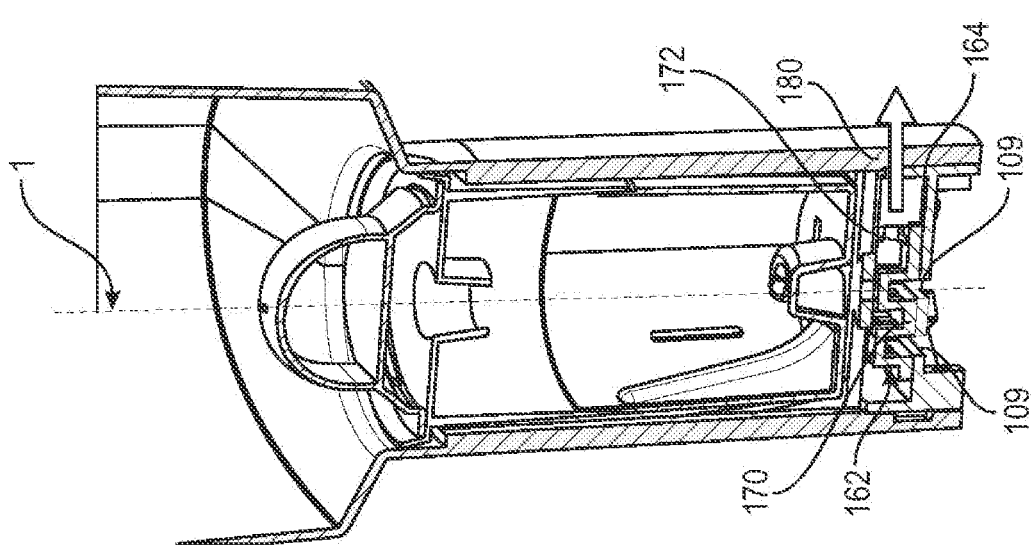

The mating polymagnets 120, 160 are coded such that attraction and repulsion forces combine at the polarity transitions to partially cancel normal forces and to create shear forces in accordance with a desired movement behavior. As shown in FIGS. 16 and 19, when filter cartridge 116 is fully inserted within hopper 118, the polymagnets are in a desired alignment and proximity position, such that the polymagnets produce both repel and attract forces that combine to cause a shear force that shifts magnet carrier 162 radially (left, as shown in the Figures), perpendicular to the longitudinal axis 1 of the filter cartridge, towards a second (open) position in accordance with the desired movement behavior. Generally, more of the opposing magnetic source pairs are in an attraction state than magnetic source pairs are in a repulsion state. As the filter cartridge 116 and magnet 120 moves toward the alignment position, a slight imbalance exists where the attraction forces cause the magnet carrier 162 to pull towards the filter magnet and the repulsion forces cause the magnet carrier 162 to push away from the alignment position.

As the filter magnet 120 reaches the alignment position and the coded polymagnets are in operating proximity, as shown in FIGS. 16 and 19, the attraction forces increase and the repulsion forces decrease until the complementary magnetic sources achieve alignment and full attraction at the second position, generating sufficient shear force to move the magnet carrier 162 laterally in the direction of arrow 180 to open blocking component 170, which in turn compresses resilient member 172, such that fluid may flow through fluid ports 163 in the magnet carrier 162 and through aperture(s) or opening(s) 109. The net attractive force between magnets 120, 160 acts to "pull" the filter cartridge 116 into the installed position and provides positive, tactile feedback to the user in the form of a magnetic "latch," indicating proper sealing. While the blocking component may be integral with the carrier 162, blocking component 170 may also be separate from carrier 162 such that it is in mechanical communication with the carrier 162. In other embodiments, the blocking member 170 may be in mechanical communication with coded polymagnet 160.

Figure 17:
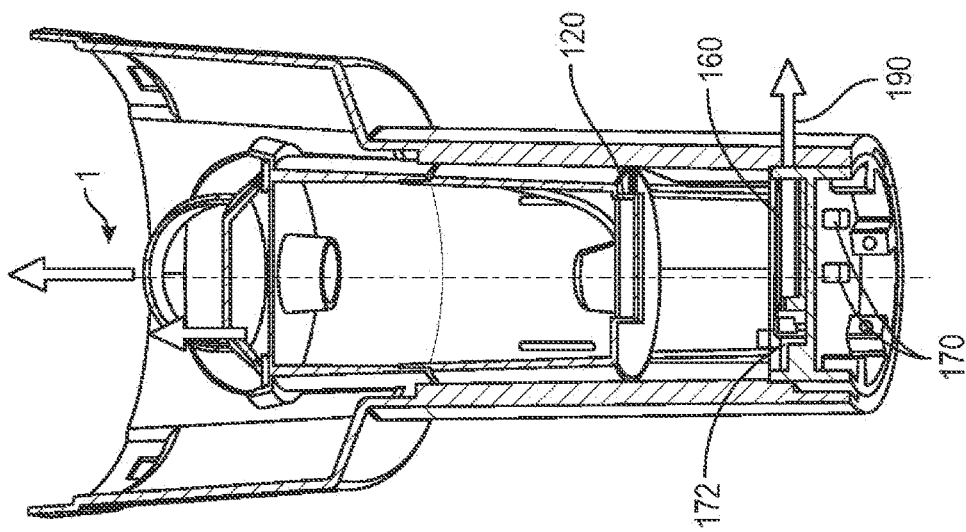
FIGS. 15-17 depict plan views of the filter cartridge and pitcher of FIG. 14, showing the interaction of the correlated magnets from just prior to insertion of the filter cartridge, through installation and removal.
Figure 20:
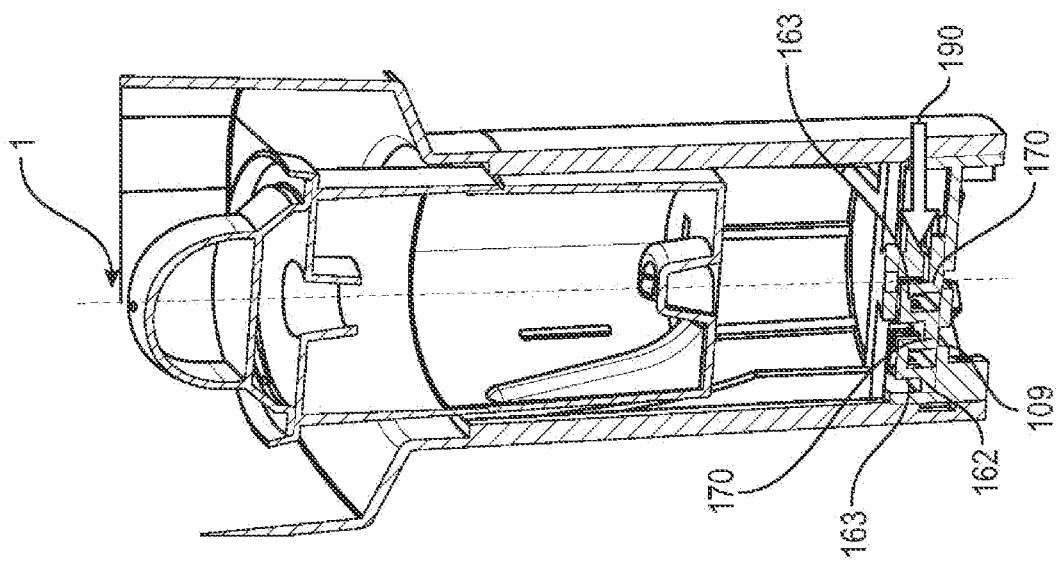
FIGS. 18-20 depict cross-sectional views of the filter cartridge and pitcher of FIGS. 15-17, respectively, showing the movement of the hopper magnet holder from just prior to insertion of the filter cartridge, through installation and removal.

As shown in FIGS. 17 and 20, pulling the filter cartridge 116 upwards causes the magnets 120, 160 to misalign, which causes magnet carrier 162 to be biased back into the "home" position by the expanding resilient member 172, as shown by arrow 190, and thus closing blocking component 170 and restricting filtered egress fluid flow through opening(s) 109 to the bottom reservoir.

This embodiment has similar advantages to that of the embodiment shown in FIGS. 6-12, including authentication and anti-counterfeiting advantages, insomuch that if the filter cartridge 116 did not include a correspondingly coded polymagnet, or did not include a magnet at all, the magnet carrier 162 would not move and would remain biased in the "home" position, as shown in FIG. 15, and blocking component 170 would remain closed, restricting filtered egress water flow through aperture(s) 109 to the lower, dispensing reservoir.

Referring now to FIGS. 21-27, collectively, yet another embodiment of a filter interconnect of the present invention is shown, wherein the polymagnets are positioned to present a shear force to cause rotation about the longitudinal axis 1 of the filter cartridge.

Figure 21:
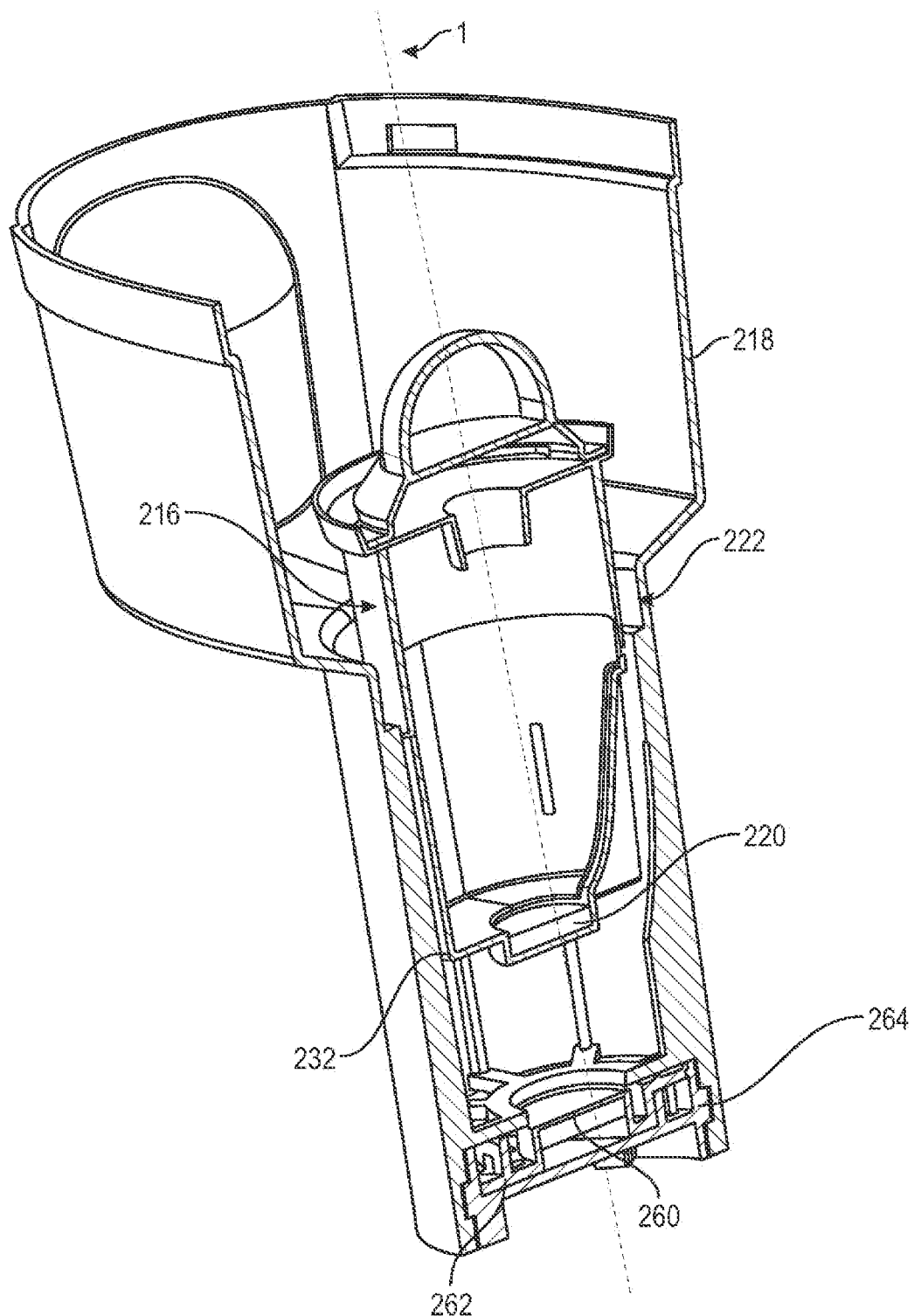
FIG. 21 depicts a perspective, cross-sectional view of still yet another embodiment of a filter cartridge and pitcher according to the present invention, prior to insertion of the filter cartridge. In this embodiment, the polymagnets are positioned to present a rotational force to cause rotation of a carrier plate about the longitudinal axis of the filter cartridge.

In this embodiment, as best seen in FIG. 21, polymagnet 220 is fixed on the underside of housing base cap 232 of filter cartridge 216. Hopper 218 includes a magnet holder 264 fixedly positioned at the base of cylindrical recess 222, and a magnet carrier or plate 262 which is rotatable within holder 264 about the longitudinal axis 1 of the filter cartridge 216, and normally biased in a "home" or blocking position by resilient member 272.

Figure 22:
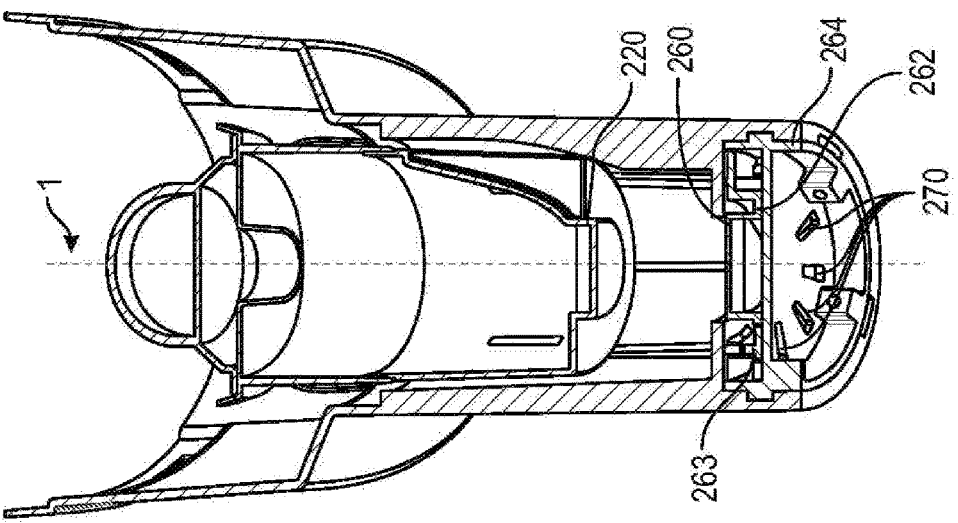
Figure 25:
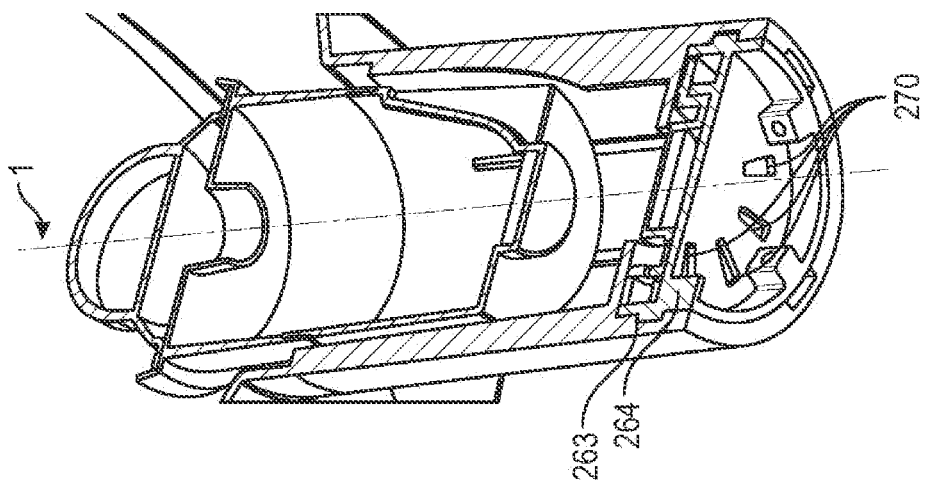

When in the "home" position, as shown in FIGS. 22 and 25, blocking component 270 of carrier 262 blocks opening(s) or aperture(s) 209, restricting filtered egress fluid flow to the bottom reservoir of the gravity-fed pitcher. Disposed within magnet carrier 262 is a correspondingly coded polymagnet 260 for mating with polymagnet 220.

Figure 23:
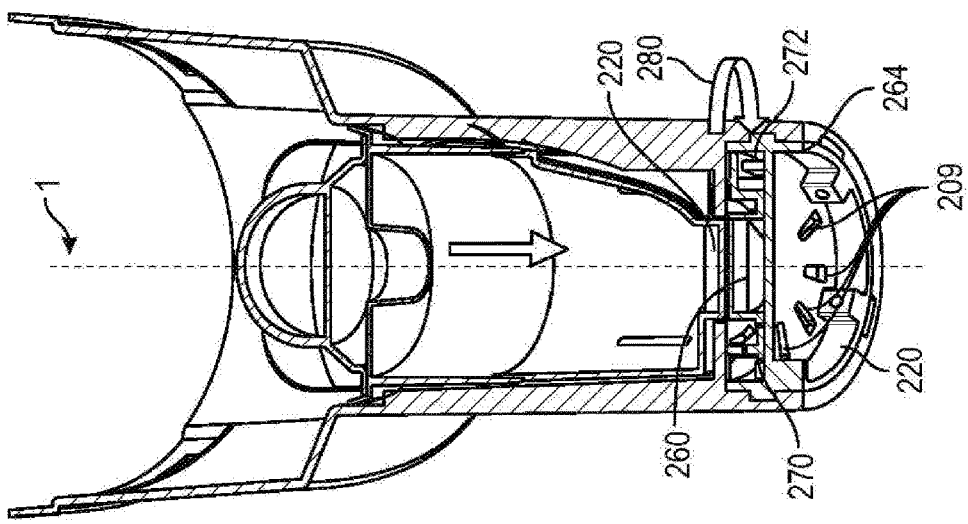
Figure 26:
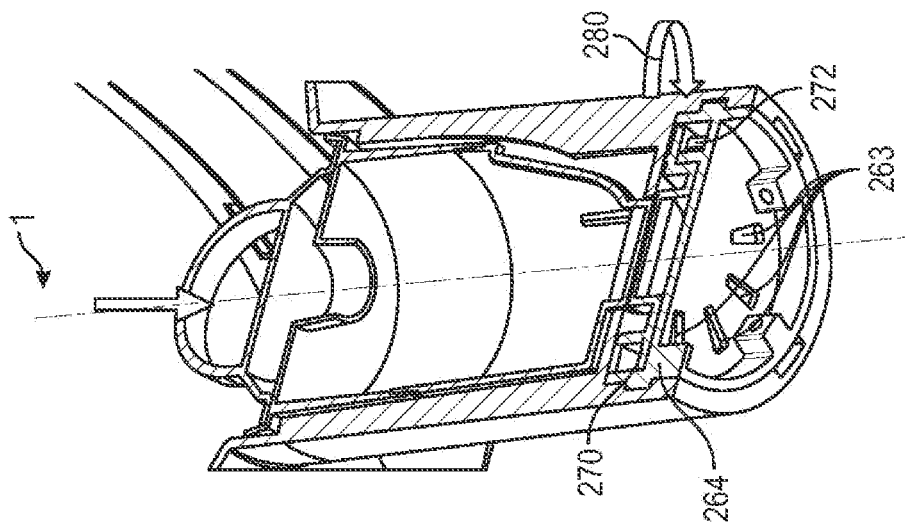

The mating polymagnets 220, 260 are coded such that attraction and repulsion forces combine at the polarity transitions to partially cancel normal forces and to create rotational forces in accordance with a desired movement behavior. As shown in FIGS. 23 and 26, when filter cartridge 216 is fully inserted within hopper 218, the polymagnets are in a desired alignment and proximity position, such that the polymagnets produce both repulsion and attraction forces that combine to cause magnet carrier 262 to rotate (counterclockwise in this exemplary embodiment, as shown in the figures) about the longitudinal axis 1 of the filter cartridge, towards a second (open) position in accordance with the desired movement behavior. In this position, fluid may egress through one or more ports 263 within the magnet carrier 262. It should be understood by one skilled in the art that the polymagnets may be coded to cause rotation in a clockwise direction towards the second position.

The polarity transitions of the filter magnet 220 and carrier magnet 260 are aligned such that when the magnets are in phase, there is attraction in the axial direction, and when out of phase, there is repulsion in the axial direction. The repulsion force when out of phase causes a net rotational force that drives to align polarity. When the filter cartridge 216 is first inserted into the hopper 218 and approaches the carrier magnet 260, as shown in FIGS. 22 and 25, the magnets 220, 260 are initially out of phase. As the filter magnet 220 reaches the alignment position and the coded polymagnets are in operating proximity, as shown in FIGS. 22 and 26, the net rotational force is sufficient to cause magnet carrier 262 to rotate about the longitudinal axis 1 of the filter cartridge 216 in the direction of arrow 280 to the second (open) position, compressing resilient member 272, to open blocking component 270 and permit filtered fluid outflow through opening(s) 209 to a second, dispensing reservoir.

Once the carrier 262 has rotated to the second position, the polarity transitions are aligned such that there is a net attraction between filter magnet 220 and carrier magnet 260 which acts to "pull" the filter cartridge 216 downward into the installed position and holds it in place. As in the previous embodiments, the magnetic communication between magnets 220, 260 provides positive, tactile feedback to the user in the form of a magnetic "latch," indicating proper sealing. The net attraction force is strong enough to hold the filter cartridge 216 in place in the installed position, but not too strong to make removal of the filter cartridge challenging for the end user.

Figure 24:
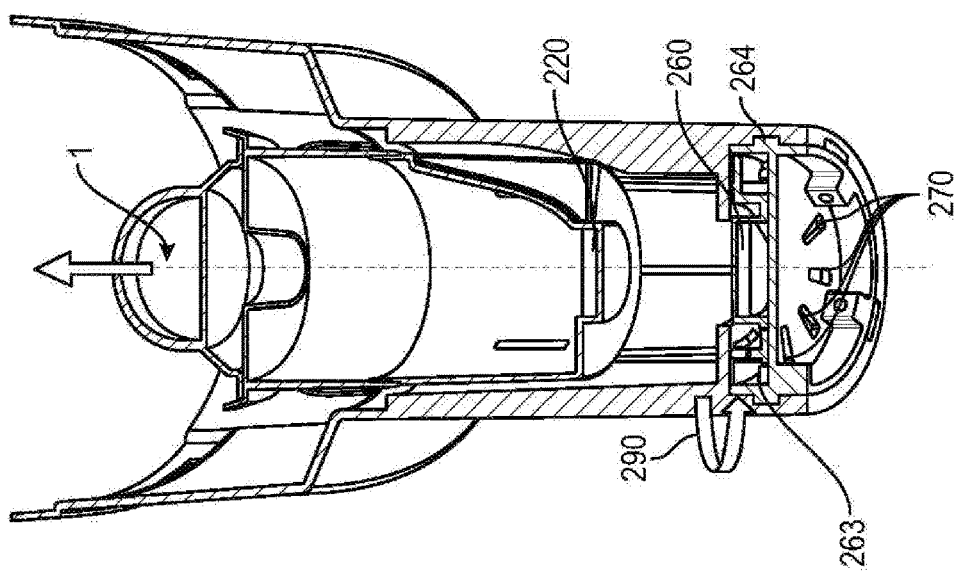
FIGS. 22-24 depict plan, cross-sectional views of the filter cartridge and pitcher of FIG. 21, showing the interaction of the correlated magnets from just prior to insertion of the filter cartridge, through installation and removal.
Figure 27:
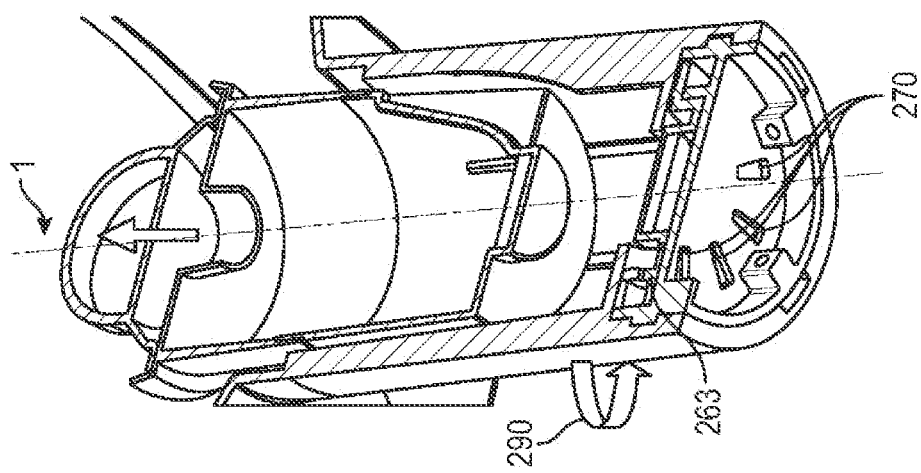
FIGS. 25-27 depict perspective, cross-sectional views of the filter cartridge and pitcher of FIGS. 22-24, respectively, showing the movement of the hopper magnet holder from just prior to insertion of the filter cartridge, through installation and removal.

As shown in FIGS. 24 and 27, pulling the filter cartridge 216 upwards causes the magnets 220, 260 to misalign, which causes magnet carrier 262 to be biased back into the "home" position by resilient member 272, as shown by arrow 290, and thus closing blocking component 270 and restricting filtered egress fluid flow through aperture 209 to the bottom reservoir. While the blocking component may be integral with the carrier 262, blocking component 270 may also be separate from carrier 262 such that it is in mechanical communication with the carrier 262. In other embodiments, the blocking member 270 may be in mechanical communication with coded polymagnet 260.

In that correlated magnets are characterized by dense and tunable magnetic fields, it is possible to specifically engineer force curves with higher force at shorter working distances, such as those shown herein in FIGS. 6-27. A conventional magnet would be unable to produce sufficient magnetic shear force over such a short effective working distance without significantly increasing the physical size of the magnet, which would present design feasibility issues. Alignment polymagnets, such as those of the present invention, allow for attraction and repel forces to combine at polarity transitions to partially cancel normal forces and create stronger shear forces over shorter linear offset distances.

Another advantage of the present invention is that by utilizing corresponding coded or "keyed" polymagnets with specifically-engineered magnetic fields, the present invention further has applications in alternate methods of filter cartridge authentication and counterfeiting prevention. Only filter cartridges including a "coded" polymagnet having a pre-designed or predetermined polarity profile which corresponds to that of the polymagnet in the pitcher hopper will operate correctly. Therefore, only genuine replacement filter cartridges from the manufacturer or its licensee will be authenticated. This limits the counterfeiting market, which is especially important with respect to the safety of consumers who believe that they may be able to save money by purchasing a non-authentic replacement filter cartridge which mechanically may connect to a mating hopper, but may nonetheless not have an enclosed filter media which is as effective for removal of contaminants or impurities in water as that of the filter media of a genuine replacement part.

Thus, the present invention achieves one or more of the following advantages. The present invention provides an improved filter interconnect structure for a filter cartridge and a corresponding pitcher hopper which utilizes coded polymagnets to assist in filter installation and replacement, as well as aid in downstream system functionality, such as actuating a blocking component, either directly or indirectly, to perform a variety of functions, such as but not limited to allowing for or preventing the flow of water. The present invention further provides an improved method of installing a filter cartridge in a corresponding pitcher hopper which utilizes correlated magnetism to provide positive, tactile feedback for a user indicating proper filter cartridge installation. By utilizing coded polymagnets with specifically-engineered force curves, the present invention further has applications in alternate methods of filter cartridge authentication and counterfeiting prevention.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filter cartridge for use in a gravity-fed filtration system, the filter cartridge comprising:
   a housing having a body, a top end portion, a bottom end portion, and a central longitudinal axis;
   a filter media disposed within said housing body; and
   a housing base cap on said housing bottom end portion, said housing base cap including a filter magnet disposed therein and completely encapsulating said filter magnet;
   wherein said filter magnet includes a coded polymagnet.

2. The filter cartridge of claim 1 wherein said housing includes at least one aperture at said top end portion for fluid ingress, and at least one aperture at or proximate to said bottom end portion for fluid egress.

3. The filter cartridge of claim 2 wherein said at least one aperture at or proximate to said bottom end portion comprises a plurality of apertures.

4. The filter cartridge of claim 3 wherein each of said plurality of apertures is spaced circumferentially about said filter cartridge bottom end portion.

5. The filter cartridge of claim 1 wherein upon insertion of said filter cartridge into a recess in a bottom surface of a filter reservoir, said filter magnet is placed in magnetic communication with a carrier having a carrier magnet when said filter cartridge is inserted into said recess, said carrier rotatable as a result of magnetic communication between said filter magnet and said carrier magnet, wherein upon rotation filtered water is allowed to flow from said filter cartridge to a receiving reservoir.

6. The filter cartridge of claim 1 wherein said coded polymagnet is a correlated magnet having a plurality of magnetic field emission sources, such that a magnetic shear force is generated between said filter magnet and a corresponding coded carrier magnet to actuate a sluice gate valve when said filter cartridge is inserted within a receiving holder containing said corresponding coded carrier magnet.

* * * * *